I. M. JACOBS & W. CRAMER.
SUPPORT FOR GASOLENE TANKS IN MOTOR VEHICLES.
APPLICATION FILED OCT. 26, 1917.
1,273,614.
Patented July 23, 1918.
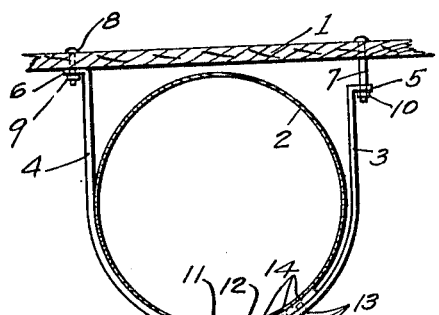
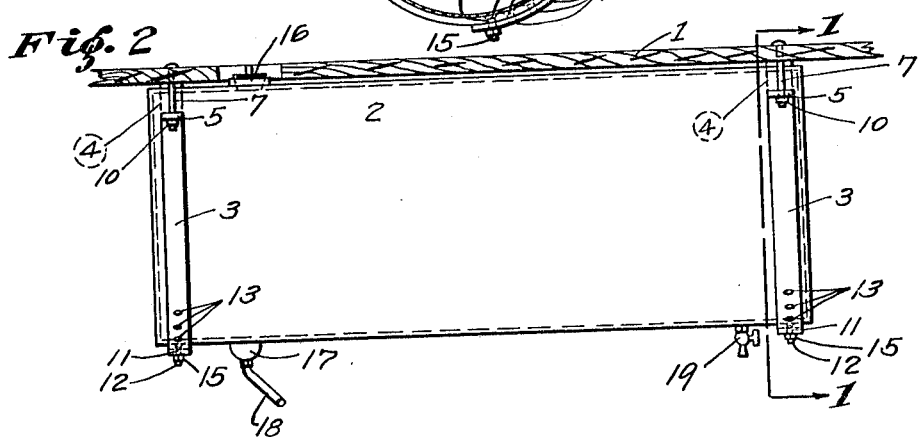
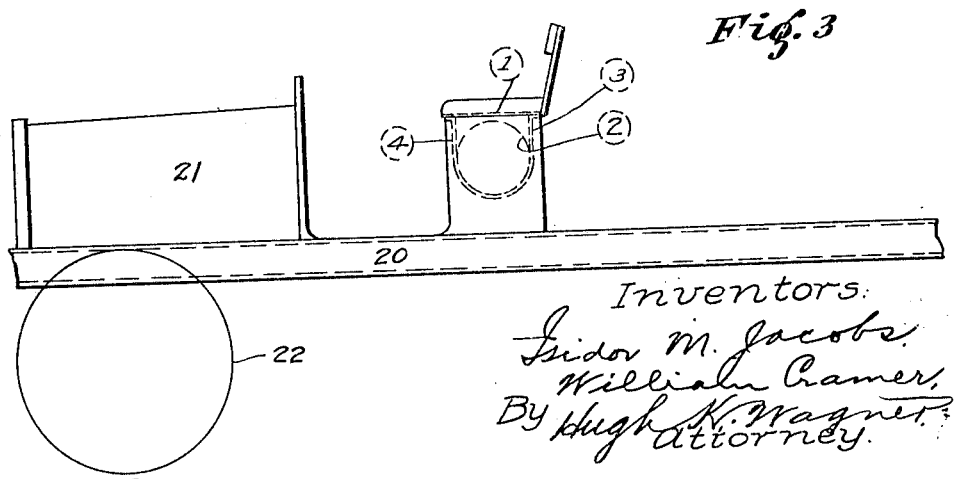

UNITED STATES PATENT OFFICE.

ISIDOR M. JACOBS, OF KANSAS CITY, AND WILLIAM CRAMER, OF ST. LOUIS, MISSOURI, ASSIGNORS, BY MESNE ASSIGNMENTS, TO TRUCK, TRACTOR AND MANUFACTURING COMPANY, OF ST. LOUIS, MISSOURI, A CORPORATION OF MISSOURI.

SUPPORT FOR GASOLENE-TANKS IN MOTOR-VEHICLES.

1,273,614.

Specification of Letters Patent. Patented July 23, 1918.

Application filed October 26, 1917. Serial No. 198,641.

*To all whom it may concern:*

Be it known that we, ISIDOR M. JACOBS and WILLIAM CRAMER, citizens of the United States, residing at Kansas City, in the county of Jackson and State of Missouri, and St. Louis, State of Missouri, respectively, have invented certain new and useful Improvements in Supports for Gasolene-Tanks in Motor-Vehicles, of which the following is a specification.

This invention relates to means for supporting gasolene tanks in motor vehicles. In pleasure vehicles it is not so important how they are suspended as the pneumatic tires and vehicle springs preserve them from shock, but when gasolene tanks are supported on a solid body in a truck, tractor, or tractor truck, the shock and vibration imparted to the gasolene tank soon produces a leak, this being due to the fact that trucks and the like largely have solid rubber tires instead of pneumatic tires and are also deficient in springs or provided with less resilient springs, as compared with pleasure cars.

The object of this invention is to provide suspension rather than support for the gasolene tank of a truck, tractor, or tractor truck, although of course it is adapted for use in other constructions.

In the accompanying drawings forming part of this specification, in which like numbers of reference denote like parts wherever they occur, Figure 1 is an end elevation;

Fig. 2 is a side elevation; and

Fig. 3 shows the location of this invention relative to the frame and other parts of a motor vehicle.

Suspended from any suitable support, such for instance as the seat 1 of a motor vehicle, is the gasolene tank 2, which is loosely and adjustably held by a pair of strap supports 3 and 4, like pipe-hangers. There is a pair of straps 3 and 4 on each end of the tank 2. The pipe-hanger 3 is provided at the top with a lug 5 and pipe-hanger 4 is similarly provided with a lug 6. Through the lugs 5 and 6 bolts 7 and 8 pass to connect the straps 3 and 4 to the support 1, the nut 9 binding lug 6 tightly to the support 1 while nut 10 acts as a support for the lug 5 and can draw the same as closely to the support 1 as may be desired but may also allow the same room for adjustment, as clearly shown in Fig. 1.

Bolt 11 having head 12 passes through one of the holes 13 in the straps 3 and 4, the said bolt head 12 being adapted to fit in the counter-sinks 14 in the holes 13 and thus to leave no wearing surface to contact with the outside of tank 2. Nut 15 on bolt 11 fastens the overlapping ends of straps 3 and 4 together and makes it possible to adjust the standard size of this invention to any size of gasolene tank 2.

The gasolene tank will be provided with the usual inlet-port 16 and strainer 17 and pipe line 18 to the carbureter. The pet cock drain 19 will be used in case of emergency.

Having thus described this invention, we hereby reserve the benefit of all changes in form, arrangement, order, or use of parts, as it is evident that many minor changes may be made therein without departing from the spirit of this invention, or the scope of the following claims.

We claim:

1. A support for a gasolene tank in a motor vehicle, comprising a pair of straps at each end of the tank, the said straps at one end overlapping each other and having registering holes in each, a bolt and nut for connecting the said overlapping ends through a pair of the said registering holes, and a pair of bolts for connecting the said straps to the vehicle seat.

2. The combination with a support of means for supporting a tank out of engagement with said support comprising two pairs of straps, means for connecting the overlapping ends of each pair of straps together, means for rigidly securing one strap of each pair of straps to said support, and means for adjustably suspending the other strap of each pair of straps from said support whereby the tank can be adjusted relative to the support.

3. The combination with a support of means for suspending a tank therefrom comprising two pairs of straps, each strap of which is provided with a lug, means for rigidly attaching the lug of one strap of each pair of straps to said support, means for adjustably suspending the other strap of each pair of straps by its lug relative to said support, and means for adjustably connecting the overlapping ends of said straps together.

4. In a device of the character described, the combination of a support, four curved strap members depending therefrom, the lower ends of each pair of which overlap each other and are provided with a plurality of holes adapted to register, a bolt and nut adapted to connect the said overlapping straps through the said holes, one of each pair of the said straps being shorter than its mate, a bolt and nut adapted adjustably to bind the said shorter strap to the support, and means for fixing the opposing strap to the said support.

In testimony whereof we hereunto affix our signatures.

ISIDOR M. JACOBS.
WILLIAM CRAMER.

Copies of this patent may be obtained for five cents each, by addressing the "Commissioner of Patents, Washington, D. C."